(No Model.)
S. E. COVINGTON.
FLOWER STAND.
No. 422,297. Patented Feb. 25, 1890.
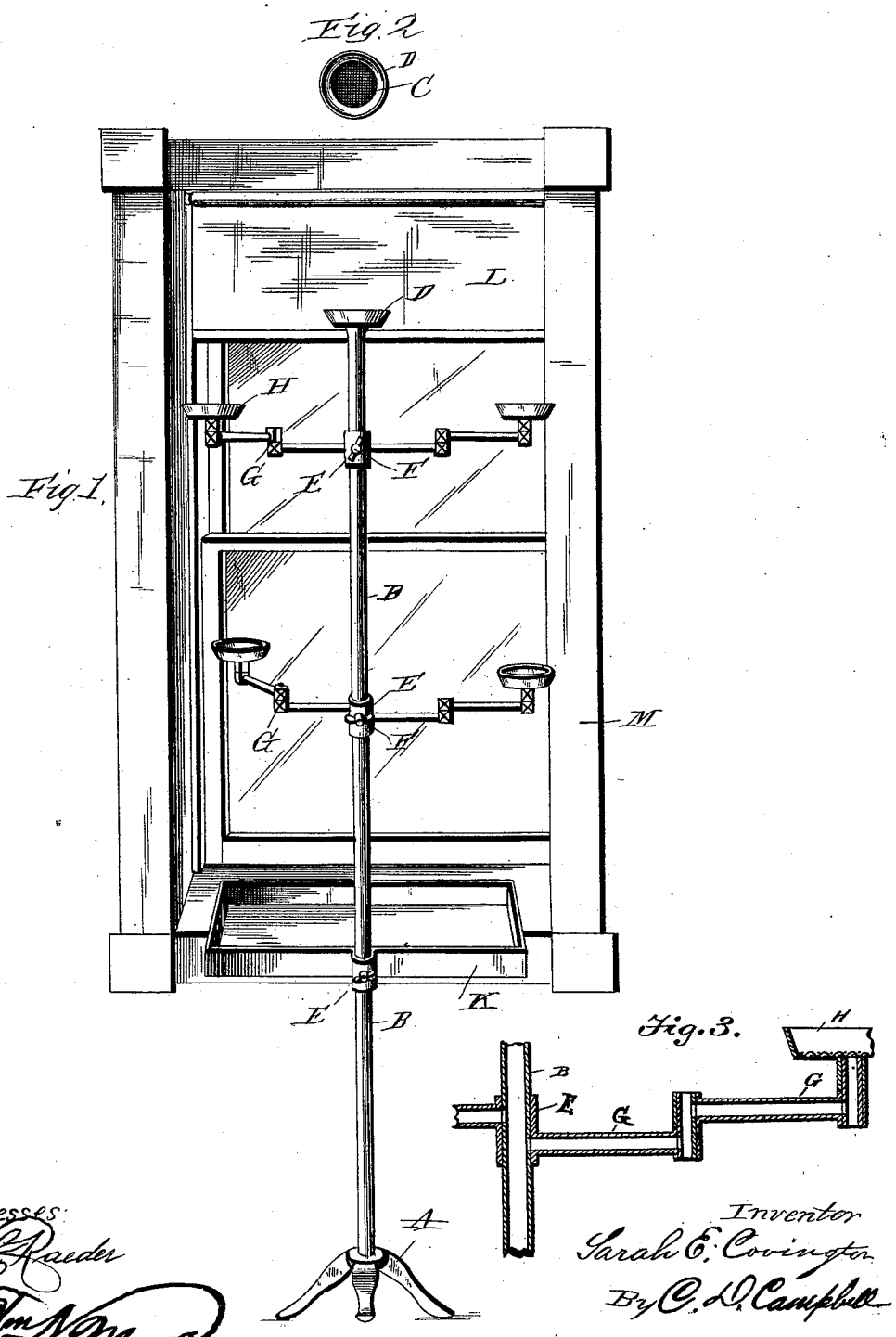

UNITED STATES PATENT OFFICE.

SARAH E. COVINGTON, OF BELLEFONTAINE, OHIO.

FLOWER-STAND.

SPECIFICATION forming part of Letters Patent No. 422,297, dated February 25, 1890.

Application filed October 26, 1889. Serial No. 328,362. (No model.)

*To all whom it may concern:*

Be it known that I, SARAH E. COVINGTON, a citizen of the United States, and a resident of Bellefontaine, in the county of Logan and State of Ohio, have invented a new and useful Flower-Stand, of which the following is a specification.

My invention relates to certain improvements in ornamental flower-stands.

Figure 1 is a perspective view of my stand, partly supported by a window-sill; and Fig. 2, a top view of the upright hollow standard. Fig. 3 is a detail view of part of the flower-stand.

The construction and operation of my device are as follows:

On a base A, I locate a hollow upright standard B, open at its top and having a screen C over its open end. A flower-pot, boat-shaped, round, or other shape, having a hole in its bottom, is screwed on the top of the pipe and filled with earth to receive flowers. Lower down on the standard are sliding collars E, having jointed brackets G, similar to gas-brackets, projecting out sidewise from them. The collars can be slid up and down to any points desired, and are fastened where wanted by the thumb-screws F. On the ends of the brackets are brackets or pans for receiving flowers. Beneath these brackets and attached to the lowest collar is a pan projecting to one side of the standard. This pan is also adjustable up and down on the standards (to adapt it to rest on window-sills of different heights) intended to receive flower-pots, catch the drippings from the pots above, and also serve to steady the stand by resting upon the window-sill, the sill receiving the weight of the larger flower-pots in the pan and acting to steady the stand.

In position the stand is located near enough the window to allow the pan to rest upon the sill, but far enough out to allow the window-blind L to be rolled up and down. The flower-pot on top of the standard being harder to reach and water than the others, I leave an opening through it to the hollow pipe, only covered by the screen C. Then when I water the flowers in the upper pot I pour in enough to fill up the pipe, and the evaporation and the water drawn up by the roots of the flowers will enable the plants in the upper parts to go a long time without watering. Connections can be made through hollow brackets to thus water all the flowers on the stand, as shown in Fig. 3.

The object of my invention is to provide a neat, safe, and convenient stand for flower-pots—one that will take up little space in the room, and will use the window-sill to support the flower-pots and to steady the stand.

What I claim is—

In a flower-stand, the combination, with the standard A and brackets G, of a drip and steadying pan located to one side of the standard and adjustable vertically to adapt itself to the different heights of window-sills, as and for the purpose set forth.

SARAH E. COVINGTON.

Witnesses:
IVA A. KESLER,
E. K. CAMPBELL.